(12) United States Patent
Rahman et al.

(10) Patent No.: US 7,684,720 B2
(45) Date of Patent: Mar. 23, 2010

(54) MACHINE INTEGRATED SEMI-AUTOMATED SERVICE CREDIT FOR A METERED DEVICE

(75) Inventors: Shahana Rahman, Webster, NY (US); William Tay, Rochester, NY (US); Mirelsa Fontanes, Webster, NY (US); Minette A. Beabes, Rochester, NY (US); Xin Guo, Penfield, NY (US); Joyce Nakada, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 257 days.

(21) Appl. No.: 11/818,706

(22) Filed: Jun. 15, 2007

(65) Prior Publication Data

US 2008/0310875 A1 Dec. 18, 2008

(51) Int. Cl.
*G03G 21/02* (2006.01)
(52) U.S. Cl. .......................... 399/79; 235/382; 705/400
(58) Field of Classification Search ................... 399/79; 235/382; 705/400
See application file for complete search history.

(56) References Cited

U.S. PATENT DOCUMENTS

| | | | |
|---|---|---|---|
| 6,484,934 B2 * | 11/2002 | Salgado | 235/375 |
| 2004/0111315 A1 | 6/2004 | Sharma et al. | |
| 2004/0111699 A1 | 6/2004 | Rockwell | |
| 2004/0111709 A1 | 6/2004 | Furst et al. | |
| 2004/0125403 A1 | 7/2004 | Furst et al. | |
| 2004/0128375 A1 | 7/2004 | Rockwell | |
| 2004/0128669 A1 | 7/2004 | Furst et al. | |
| 2005/0004974 A1 | 1/2005 | Sharma et al. | |
| 2005/0058468 A1 * | 3/2005 | Reynolds | 399/79 |
| 2006/0133838 A1 * | 6/2006 | Isoda | 399/79 |
| 2006/0171377 A1 | 8/2006 | Gusmano et al. | |
| 2007/0017968 A1 | 1/2007 | Beabes et al. | |
| 2007/0196121 A1 * | 8/2007 | Ohnishi | 399/79 |

* cited by examiner

*Primary Examiner*—Quana M Grainger
(74) *Attorney, Agent, or Firm*—Carter, DeLuca, Farrell & Schmidt, LLP

(57) ABSTRACT

A metered device includes a printing system for generating billable and non-billable electrostatographic images. The device includes a billing meter configured to store usage data related to the generation of the electrostatographic images. A CPU or processing unit is configured to increment the billing meter for each billable and non-billable electrostatographic image generated by the printing system. A user interface configured for controlling the image capture device, enables interrogation of the CPU. The device further includes a service counter for storing usage data related to the generation of non-billable electrostatographic images. The service counter is configured for editing by the CPU through the user interface to credit the usage data stored on the billing meter. The device further includes a network interface for transmitting the usage data stored on the billing meter to a billing service and a memory for storing the usage data that is transmitted to the billing service.

14 Claims, 4 Drawing Sheets

MACHINE INTEGRATED SEMI-AUTOMATED SERVICE CREDIT FOR A METERED DEVICE

BACKGROUND

The present disclosure relates generally to printing machines, and more particularly, to multifunction printing machines.

Current electrostatographic devices such as copying machines or electronic printing machines are typically capable of counting pages. For customer records or for billing purposes, these devices include accounting mechanisms for computing the number of pages that are printed. In addition to the copy count, these devices may further acquire other information for billing purposes such as measurements of the actual use of a wide range of system services, including binding, scanning, stapling, stitching, shrink wrapping, etc. Further, the paper and toner consumption can be monitored. This information can then be used when generating a bill for the use of the device.

A conventional billing process of such an electrostatographic device begins by the customer reading the meter count for the service or services being billed. The customer then sends a hard copy document to the billing service that shows the current meter reading for the services to be billed. Alternatively, the customer may transmit the data such as by using a telephone or email. The billing service generates a hardcopy bill based upon the reported meter count. The generated hardcopy bill is then sent back to the customer and the customer can then authorize payment of the hardcopy. Once the customer authorizes payment of the bill, payment is effected, for instance by sending a check or an authorization to debit from his account, to the billing service.

In the above processes, however, the customer typically performs a reconciliation of the bill from the billing service with the meter reading from the electrostatographic device. This is accomplished by first determining what meter reading was sent to the billing service. To this end, when the customer transmits the meter reading to, or causes the meter readings to be transmitted to, the billing service, the customer typically writes the meter readings into a notebook and then transfers the meter readings to a spreadsheet. Accordingly, when the ensuing bill arrives, the customer accesses the notebook or spreadsheet and obtains the meter reading that was sent to the billing service. The meter reading that was sent may then be compared with the meter reading shown on the bill (the billed meter reading). The customer then determines what service credits are shown on the bill and applies these credits to the meter reading to determine if the bill correctly reflects the amount due to the billing service.

Obviously, such manual bill reconciliation may not be overly burdensome when a single electrostatic device of limited functionality is the sole device to be reconciled. The process quickly becomes complex and burdensome, however, when multiple services are possible on hundreds or even thousands of metered devices. The complexity of the problem is further exacerbated in situations where multiple parties are to be billed for each of the devices.

SUMMARY

According to aspects illustrated herein, a metered device includes a printing system for generating billable and non-billable electrostatographic images. The device includes a billing meter configured to store usage data related to the generation of the electrostatographic images. A CPU or processing unit is configured to increment the billing meter for each billable and non-billable electrostatographic image generated by the printing system. A user interface configured for controlling the image capture device, enables interrogation of the CPU. The device further includes a service counter for storing usage data related to the generation of non-billable electrostatographic images. The service counter is configured for editing by the CPU through the user interface to credit the usage data stored on the billing meter. The device further includes a network interface for transmitting the usage data stored on the billing meter to a billing service and a memory for storing the usage data that is transmitted to the billing service.

In a further embodiment, a method for crediting a metered device for non-billable usage includes generating billable and non-billable usage of the metered device, incrementing a billing meter configured to store information related to both billable and non-billable usage of the metered device, providing an editable counter configured to store usage data related to the non-billable usage, providing a user interface for allowing manipulation of the editable counter to credit the billing meter for the non-billable usage, transmitting the usage data stored in the editable counter to the billing meter; and transmitting the usage data stored in the billing meter to a billing service.

In another embodiment, a system for crediting a metered device for a non-billable usage includes a printing system for generating electrostatographic images, a billing meter configured to store usage data related to the generation of the electrostatographic images, and a CPU or processing unit configured to increment the billing meter for each electrostatographic image generated by the printing system, wherein the CPU is configured for interrogation by at least one of a customer and a service technician through a user interface. The user interface is configured to control the metered device. The system further includes a service counter for storing usage data related to the generation of non-billable electrostatographic images, wherein the service counter is configured for editing by the CPU through the user interface to credit the usage data stored on the billing meter. The user interface is further configured to receive an authentication password for enabling editing of the service counter. The system further includes a network interface for transmitting the usage data stored on the billing meter to a billing service and a memory for storing the usage data that is transmitted to the billing service.

BRIEF DESCRIPTION OF THE DRAWINGS

Various embodiments of the present disclosure will be described herein below with reference to the figures wherein.

DETAILED DESCRIPTION

Figure 1:
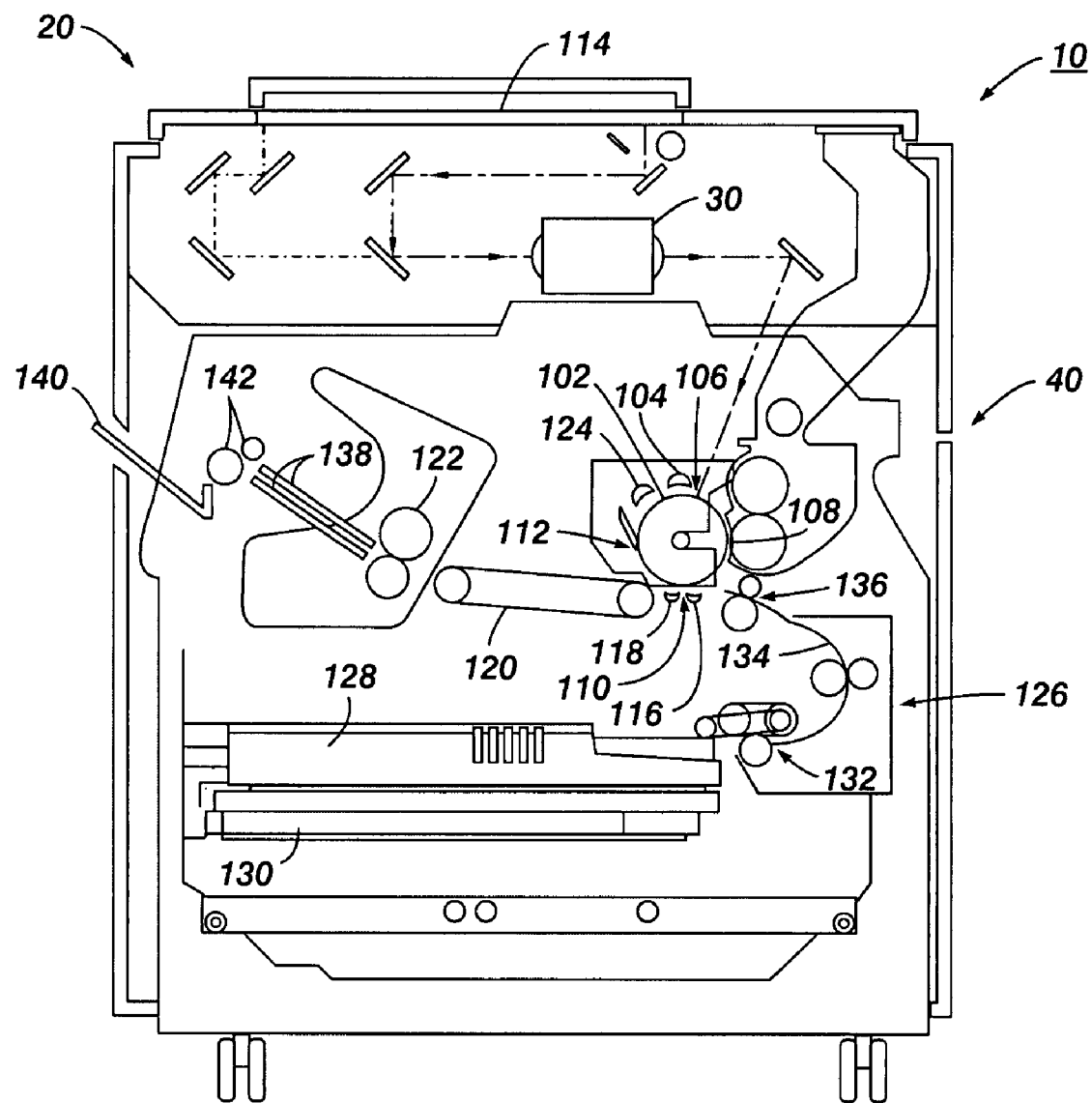
FIG. 1 shows a partial side elevational view of an exemplary networked electrophotographic machine incorporating a digital processing station.

Referring first to FIG. 1 there is shown a partial cutaway side elevational view of an exemplary multifunction electrostatographic machine 10. The machine 10 includes an image capture system 20, a digital processing station 30 and a printing system 40. The printing system 40 includes a photoreceptor drum 102 mounted for rotation (in the clockwise direction as seen in FIG. 1) to carry a photoconductive imaging surface of the drum 102 sequentially through a series of processing stations. Namely, a charging station 104, an imaging station 106, a development station 108, a transfer station 110, and a cleaning station 112.

The general operation of the printing system 40 begins by depositing a uniform electrostatic charge on the photoreceptor drum 102 at the charging station 104 such as by using a corotron. An image of a document D (see FIG. 2) to be reproduced that is positioned on a platen 114 is obtained by the image capture system 20. In this embodiment, the image capture device within the image capture system 20 is a scanning device that produces a flowing light image that is directed to a digital processing station 30. The digital processing station 30 (further described below) digitizes the flowing light image and/or passes the light image to the drum 102 at the imaging station 106 in the event that a physical copy of the document is to be made. The flowing light image selectively discharges the electrostatic charge on the photoreceptor drum 102 in the image of the document, whereby an electrostatic latent image of the document is laid down on the drum 102.

At the development station 108, the electrostatic latent image is developed into visible form by depositing toner particles on the charged areas of the photoreceptor drum 102. Cut sheets of a substrate are moved into the transfer station 110 in synchronous relation with the latent image on the drum 102 and the developed image is transferred to the substrate at the transfer station 110. A transfer corotron 116 provides an electric field to assist in the transfer of the toner particles to the substrate. The substrate is then stripped from the drum 102, the detachment being assisted by the electric field provided by an alternating current de-tack corotron 118. The substrate carrying the transferred toner image is then carried by a transport belt system 120 to a fusing station 122.

After transfer of the toner image from the drum 102, some toner particles usually remain on the drum 102. The remaining toner particles are removed at the cleaning station 112. After cleaning, any electrostatic charges remaining on the drum are removed by an alternating current erase corotron 124. The photoreceptor drum 102 is then ready to be charged again by the charging station 104, as the first step in the next copy cycle.

The transport of the substrate to the transfer station 110 in the above process is accomplished by a substrate supply system 126. In this embodiment, the substrate is selected from one of two types of substrate stored in two substrate trays, an upper, main tray 128 and a lower, auxiliary tray 130. The top sheet of substrate in the selected tray is brought, as required, into feeding engagement with a common, fixed position, sheet separator/feeder 132. The sheet separator/feeder 132 feeds a substrate around a curved guide 134 for registration at a registration point 136. Once registered, the substrate is fed into contact with the drum 102 in synchronous relation to the toner image so as to receive the toner image on the drum 102 at the transfer station 110.

The substrate carrying the transferred toner image is transported, by the transport belt system 120, to the fusing station 122, which is a heated roll fuser. The heat and pressure in the nip region between the two rolls of the fuser cause the toner particles to melt and some of the toner is forced into the fibers or pores of the substrate. The substrate with the fused image which is a copy C of the document D is then fed by the rolls in the fusing station 122 along output guides 138 into a catch tray 140 via the output roll pair 142.

Figure 2:
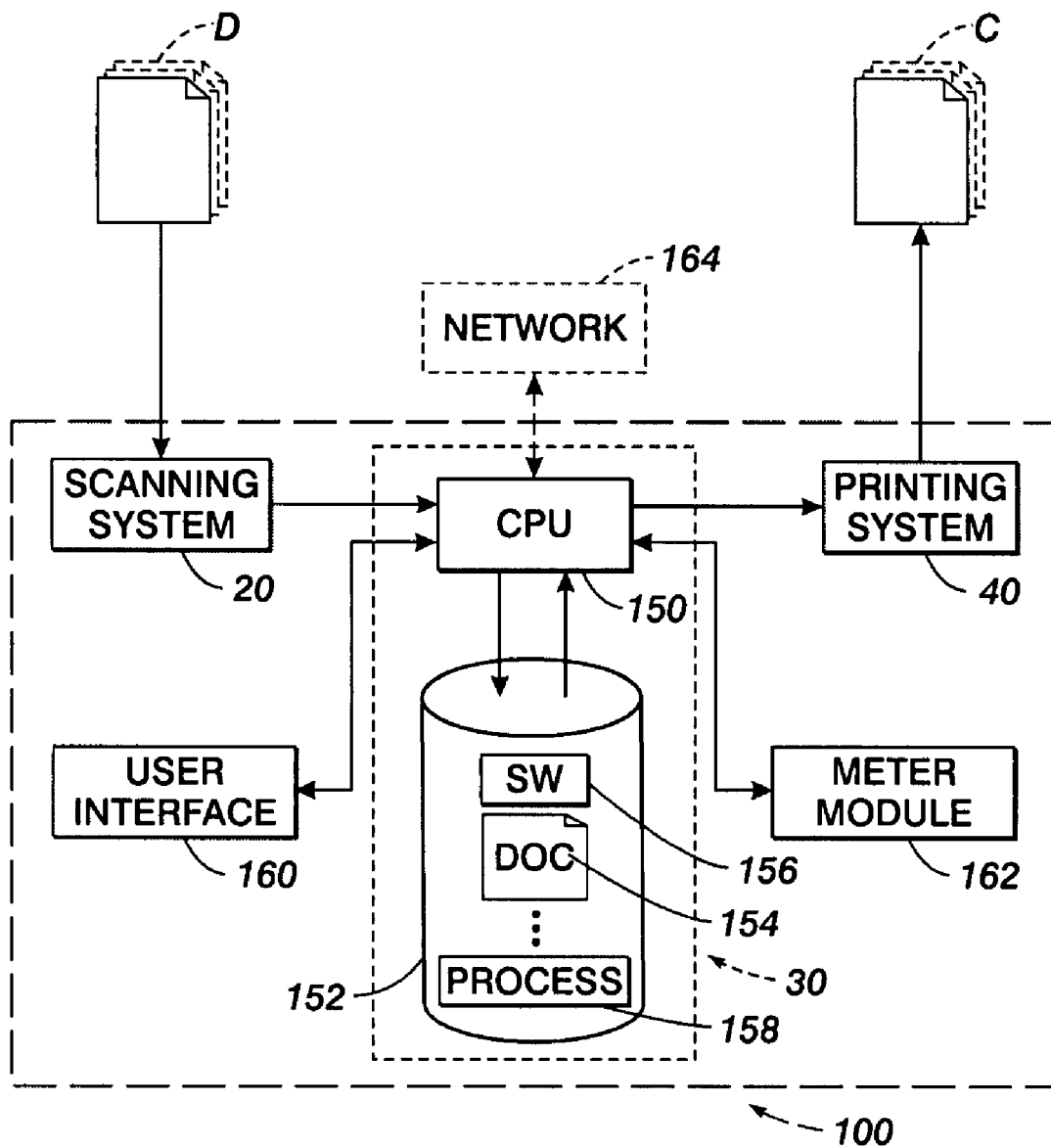
FIG. 2 shows a schematic representation of a digital processing station within the electrophotographic machine of FIG. 1.

Operation of the machine 100 is controlled by the digital processing system 30 shown in FIG. 2. The digital processing system 30 includes a CPU or processing unit 150 and a memory 152. The memory 152 is generic and may comprise RAM, ROM, CD-ROM, or other media of storage such as hard disk, magnetic tape, or the like. Other devices for accepting, capturing and storing data are well known and the above list should not be construed as exhaustive.

The memory 152 may contain stored document files 154, system software 156, and bill handling process 158 (discussed below). The system software 156 which is run by the CPU 150 may reside in ROM, RAM, or other units of storage. It will also be appreciated that the memory 152 may be a shared or distributed resource among many processors (not shown in FIG. 2) in a networked configuration.

The digital processing system 30 is connected to the image capture system 20, the printing system 40, a user interface 160, a meter module 162 and a network 164. The image capture device in this embodiment is a scanning device; however, other image capture devices may be used including, but not limited to, charge coupling devices. The user interface 160 is generically labeled and encompasses a wide variety of such devices. These interface devices include touch screens, keyboards, and graphic user interfaces.

The meter module 162 is in bidirectional communication with the CPU 150. The CPU 150 increments the meter module 162 for each use of a service of the machine 100. By way of example, the meter module 162 is incremented based upon the transport of a sheet to the registration station 136 to reflect that a copy has been made. Additional information that may be captured by the meter module 162 includes data as to whether or not the copy was a color copy, any special account under which the copy was made, and an indicator of the size of the substrate that was used. The size of the substrate used for a particular copy may be determined by sensing the tray from which the substrate is provided to the sheet separator/feeder 132 or by a sensor in the machine 100.

In embodiments of the present disclosure, the meter module 162 may further be configured to capture information such as service credits. Service credits are credits against the number of impressions that a service technician has given the customer. Such credits may be given, by way of example, if a machine malfunctions and produces a number of unacceptable prints or the service technician causes the machine 100 to produce a number of prints while the machine 100 is being serviced or repaired, i.e., in a service and/or maintenance mode. The service technician may utilize an authentication password to gain access to the CPU 150 through the user interface 160 to manipulate an editable service credit counter (not explicitly shown) included in the meter module 162 to give the customer service credits for the current billing cycle. This may be in addition to a non-editable service-impression counter included in the meter module 162 and configured to reflect a running total of service credit information, i.e., from past or present billing cycles, for a given machine. In this manner, a customer may be given service credits to adjust billable page counts without the need for subsequent manual bill reconciliation with respect to service credits for the current billing cycle. Further, the customer may be shown on the spot that a number of service credits have been given.

Figure 3:
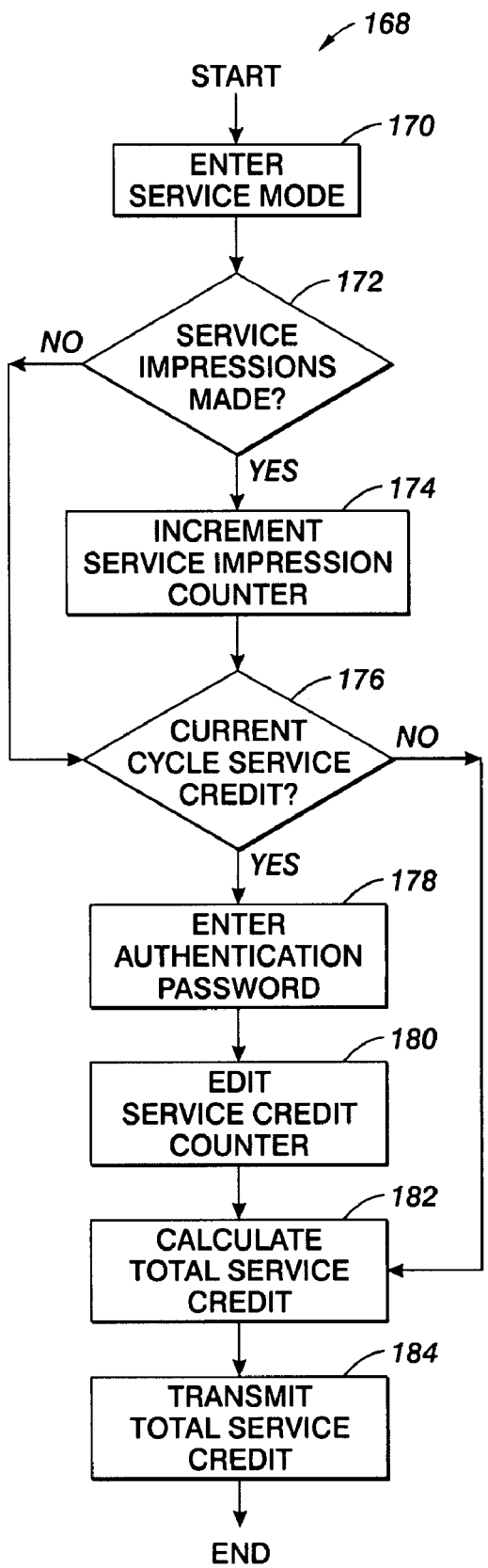
FIG. 3 shows a method of crediting a service impression generated by the electrophotographic machine of FIG. 1.

Operation of the machine 100 for giving a number of on-the-spot service credits through the user interface 160 is described with reference to the process 168 shown in FIG. 3. At the step 170, a service technician may initiate the service and/or maintenance mode by inputting a command to the CPU 150 through the user interface 160. If a service impression is made during service or maintenance of the machine 100 at step 172, the CPU 150 interrogates the meter module 162 to increment the service-impression counter at step 174. The service-impression counter is configured to keep a running total of service impressions generated for a given machine. If any number of service impressions are made at step 172, the meter module 162 is interrogated by the CPU 150 and incremented to reflect that particular number of service impressions produced. If no service impressions are made at step 172, the service credit counter is not incremented and the CPU 150 awaits further instruction from the user interface 160.

At step 176, service impressions produced while the service technician is servicing the machine 100 and./or unacceptable prints due to the malfunctioning of the machine 100 may or may not need to be credited to the customer. In response, the technician accesses the CPU 150 through the user interface 160 by completing an authentication process which may include, for example, entering a login ID and password through the user interface 160 to ensure secure access at the step 178. For example, privileged accounts may be created and stored as document files 154 in the memory 152 during the installation of the machine 100. Service technicians entering a login ID and password that match the data stored in memory 152 for a given privileged account are granted access in step 180 to a secure screen on the user interface 160 to enable manipulating (e.g., incrementing and/ or decrementing) of the editable service credit counter to give the customer the proper amount of service credits for the current billing cycle. By way of example, the service technician may carry a secure digital ID card, such as a so-called "smart card", having a randomly generated code that changes at set intervals, e.g., every thirty seconds, every minute etc. By requiring the service technician to enter a password in combination with the randomly generated code from the ID card, others are prevented from using the same user ID and password to gain privileged access. The use of biometric scanning, a magnetic swipe card, or the like is also contemplated for use in the authentication process according to embodiments of the present disclosure.

The editable service credit counter may be configured to reflect an itemized list of service credits given, e.g., separate counters for black and color impressions, as well as a counter for the total number of credits given. By way of example, the customer may receive service credits from the technician on the spot for service impressions made while the machine 100 is being serviced and/or for unacceptable prints produced inadvertently by a machine malfunction on a previous occasion. Whether or not service credits are warranted in step 178 or given in step 180, the total number of service credits for the current billing cycle are calculated by the CPU 150 in step 182. This data may include service credits for black and white and/or color service impressions as well as black and white and/or color unacceptable prints due to machine malfunctions. In step 184, the total service credit is transmitted to the meter module 162 for automated meter reading and subsequent transmission to a billing service, as will be discussed in further detail below.

In embodiments of the present disclosure, the technician need not be servicing the machine 100, i.e., initiating the service and/or maintenance mode of the machine 100, to be able to manipulate the editable service credit counter in the meter module 162. For example, a technician may be on site for reasons other than servicing a given machine or the technician may gain access to the editable service credit counter prior to or after servicing the machine 100. In this situation, the technician may enter an authentication password on the user interface 160 of the machine 100 to manipulate the editable service credit counter. In this way, past or present service impressions and/or unacceptable prints that were previously un-credited may be credited on the spot by the technician for immediate viewing by the customer.

In embodiments of the present disclosure, an accounting of the number of credits given for a given billing cycle of the machine 100 may be stored in an audit log (not explicitly shown). The audit log may be stored as document files 154 in memory 152 and include other information such as the login ID of the service technician granting a given credit or number of credits, the date and time the credit(s) was granted, etc. The audit log may be displayed on the user interface 160 along with entries from the meter module 162 for comparison and verification by the customer of each and every login and service credit issued for a given billing cycle. Further, the data entries stored in the audit log may be sent from the digital processing system 30 of the machine 100 to a secure server to allow administrative inspection and provide further information with respect to the validity of each service credit granted.

Figure 4:
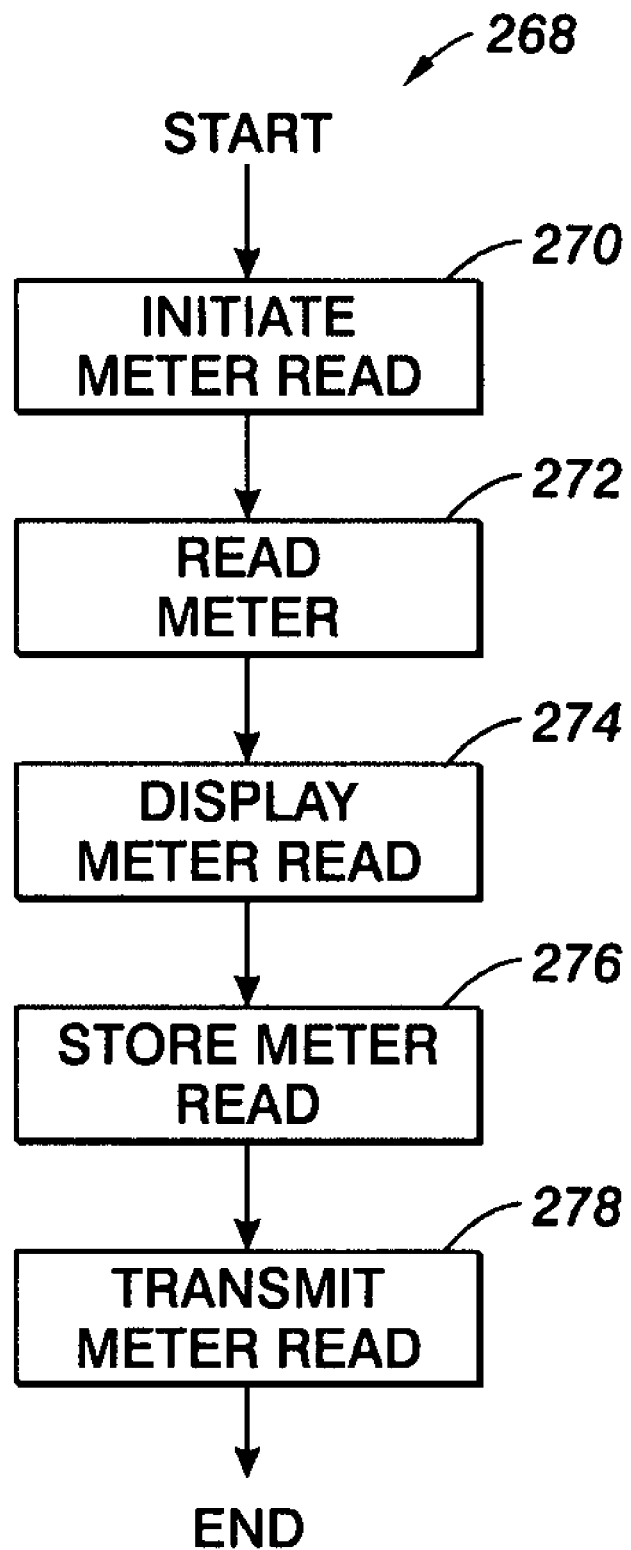
FIG. 4 shows a process for obtaining a meter reading for the use of services provided by the electrophotographic machine of FIG. 1.

Operation of the machine 100 for obtaining a meter reading is described with reference to the process 268 shown in FIG. 4. At the step 270, a customer initiates the meter reading by inputting a command to the CPU 150 through the user interface 160. In response, the CPU 150, which in this embodiment functions as a reconciliation controller, interrogates the meter module 162 at the step 272 and obtains the meter readings for the services being read. In this embodiment, the time and date of the meter reading is determined as well as indicators of the total number of impressions made, the total number of service impressions made and/or service credits given, the total number of color impressions and the total number of large color impressions made. The data is displayed to the customer at the step 274 for verification. Once the customer verifies that the meter readings are to be sent to a billing service, the meter readings are stored into the memory 152 at the step 276 and transmitted to the billing service at the step 278. The meter reading process 268 then ends.

Those of ordinary skill in the art will appreciate in alternative embodiments, the meter reading may be initiated remotely through the network 164 and the meter reading may be sent to a proxy before being sent to a billing service. In such embodiments, reconciliation modules within the proxy may be configured to perform reconciliations based upon the receipt of data from the network 164. Moreover, the meter reading may be stored in a memory other than the memory 152, such as a memory at a proxy location.

Furthermore, additional steps may be included in a bill reading process. By way of example, when displaying the present meter readings, the method may further display a previously obtained meter reading. This is useful when the meters are simple counters. In such cases, the meter reading may merely be a number. Therefore, to understand what the usage has been since the last meter reading was done, the previous meter reading must be subtracted from the current meter reading. In a further embodiment, the CPU 150 obtains the previous meter reading and identifies to the customer any meter readings that have increased by more than a predetermined amount so that the customer may verify that the reading is correct or take corrective actions, such as calling a service technician, prior to sending the meter reading to the billing service. Once the meter reading is transmitted to a billing service, a hardcopy bill is prepared using the data from the meter reading.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A metered device comprising:
   a printing system for generating billable and non-billable electrostatographic images;
   a billing meter configured to store usage data related to the generation of the electrostatographic images;
   a processing unit configured to increment the billing meter for each billable and non-billable electrostatographic image generated by the printing system;

a user interface for controlling the image capture device, the user interface being configured to enable interrogation of the processing unit;

a service counter for storing usage data related to the generation of non-billable electrostatographic images, wherein the service counter is configured for editing by the processing unit through the user interface to credit the usage data stored on the billing meter;

a network interface for transmitting the usage data stored on the billing meter to a billing service; and a memory for storing the usage data that is transmitted to the billing service, wherein the non-billable electrostatographic images are generated during (i) non-billable usage of the metered device or (ii) during servicing or repairing of the metered device; and wherein a user of the metered device is credited with on-the-spot service credits for the generated non-billable electrostatographic images via (i) a non-editable service credit counter for the non-billable usage of the metered device occurring during past or present billable cycles and (ii) an editable service credit counter for the servicing or repairing of the metered device for a current billing cycle.

2. The device according to claim 1, wherein the editable service credit counter is accessed for editing through use of an authentication password.

3. The device according to claim 1, wherein the editable service credit counter is editable by a service technician.

4. The device according to claim 1, wherein the metered device is an electrostatographic device configured to generate electrostatographic images.

5. The device according to claim 1, wherein the non-billable electrostatographic images are generated as a result of a malfunctioning of the metered device.

6. The device according to claim 1, wherein the memory includes a software module operated by the processing unit for controlling the metered device.

7. A method for crediting a metered device for non-billable usage comprising:

generating billable and non-billable usage of the metered device;

incrementing a billing meter configured to store usage data related to both billable and non-billable usage of the metered device;

providing a user interface for enabling crediting of the billing meter for the non-billable usage; and transmitting the usage data stored in the billing meter to a billing service, wherein the non-billable electrostatographic images are generated during (i) non-billable usage of the metered device or (ii) during servicing or repairing of the metered device; and wherein a user of the metered device is credited with on-the-spot service credits for the generated non-billable electrostatographic images via (i) a non-editable service credit counter for the non-billable usage of the metered device occurring during past or present billable cycles and (ii) an editable service credit counter for the servicing or repairing of the metered device for a current billing cycle.

8. The method according to claim 7, wherein the information stored in the billing meter is transmitted over a network to the billing service.

9. The method according to claim 7, further comprising the step of entering an authentication password through the user interface to enable manipulation of the editable service credit counter.

10. The method according to claim 7, further comprising the step of providing a network interface to transmit the usage data stored in the billing meter to the billing service.

11. The method according to claim 7, wherein the non-billable usage of the metered device includes at least one of usage during servicing of the metered device by a technician and usage due to a malfunction of the metered device.

12. A system for crediting a metered device for a non-billable usage comprising:

a printing system for generating electrostatographic images;

a billing meter configured to store usage data related to the generation of the electrostatographic images;

a processing unit configured to increment the billing meter for each electrostatographic image generated by the printing system, wherein the processing unit is configured for interrogation by at least one of a customer and a service technician through a user interface for controlling the metered device;

a service counter for storing usage data related to the generation of non-billable electrostatographic images, the service counter being configured for editing by the processing unit through the user interface to credit the usage data stored on the billing meter;

a network interface for transmitting the usage data stored on the billing meter to a billing service; and a memory for storing the usage data that is transmitted to the billing service, wherein the non-billable electrostatographic images are generated during (i) non-billable usage of the metered device or (ii) during servicing or repairing of the metered device; and wherein a user of the metered device is credited with on-the-spot service credits for the generated non-billable electrostatographic images via (i) a non-editable service credit counter for the non-billable usage of the metered device occurring during vast or present billable cycles and (ii) an editable service credit counter for the servicing or repairing of the metered device for a current billing cycle.

13. The system according to claim 12, wherein metered device is an electrostatographic device configured to generate electrostatographic images.

14. The system according to claim 12, wherein the non-billable usage of the metered device includes at least one of usage during servicing of the metered device by a service technician and usage due to a malfunction of the metered device.

* * * * *